Jan. 2, 1968  C. W. SOLTIS  3,360,910

FILTER FRAMING SYSTEM

Filed May 31, 1966  3 Sheets-Sheet 1

INVENTOR
CHARLES W. SOLTIS
BY
Kane, Dalsimer, Kane & Smith
ATTORNEYS

Jan. 2, 1968 C. W. SOLTIS 3,360,910
FILTER FRAMING SYSTEM
Filed May 31, 1966 3 Sheets-Sheet 2
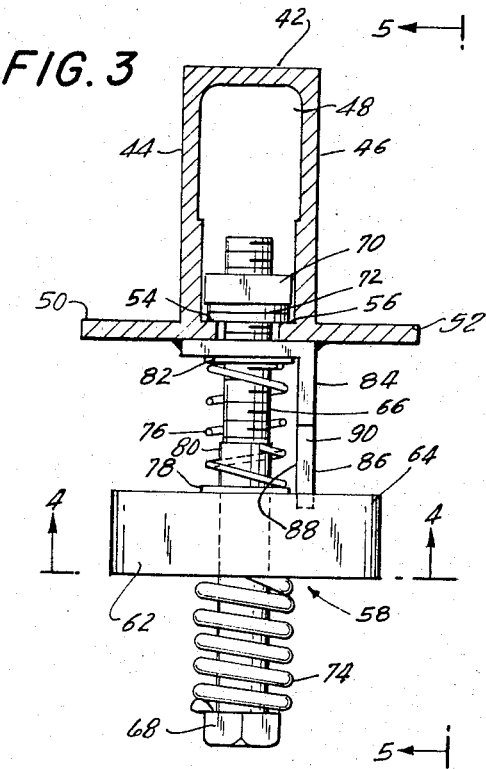
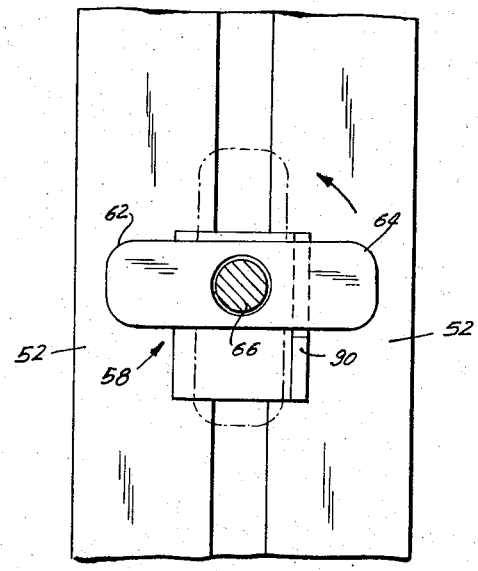
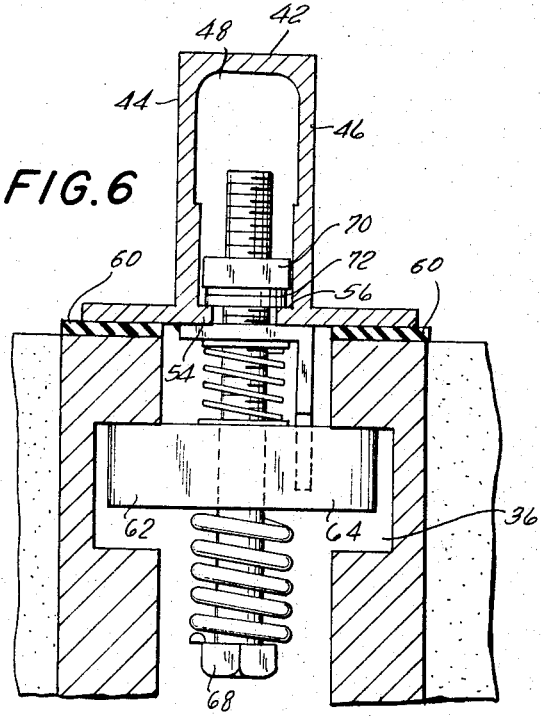
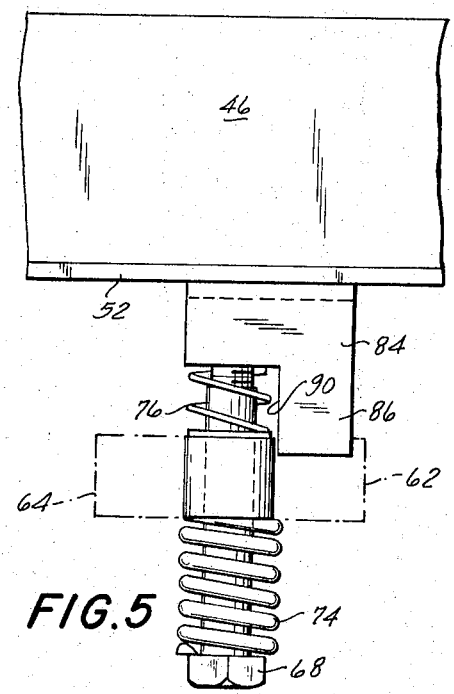
INVENTOR
CHARLES W. SOLTIS
BY
ATTORNEYS Jan. 2, 1968   C. W. SOLTIS   3,360,910
FILTER FRAMING SYSTEM
Filed May 31, 1966   3 Sheets-Sheet 3

INVENTOR
CHARLES W. SOLTIS
BY
Kane, Dalsimer, Kane & Smith
ATTORNEYS

United States Patent Office 3,360,910
Patented Jan. 2, 1968

1

3,360,910
FILTER FRAMING SYSTEM
Charles W. Soltis, Albuquerque, N. Mex., assignor to Envirco, Inc., Albuquerque, N. Mex., a corporation of New Mexico
Filed May 31, 1966, Ser. No. 553,838
7 Claims. (Cl. 55—483)

This application is a continuation-in-part of my earlier filed application Ser. No. 293,597, filed July 9, 1963, now U. S. Patent No. 3,280,540, and entitled, "Supporting and Sealing Means for Filters." The present application relates to improvements in filter framing systems and, more particularly, to a framing system that is lighter in weight and more economical.

The framing system of this invention, as well as that of the above referenced application, is pecularily suited to rather demanding applications and environments included in which are clean rooms and critical area hospital supply systems. In these applications, laminar flow principles are adapted and high efficiency filtration employed to attain the desired results. Absolute filters are employed in conjunction with these systems for filtering out 99.97% of all air-borne particles of three-tenths micron diameter or larger. In other words, Class 100 conditions pursuant to Federal Standard 209 are attained. In accordance with applicant's contribution to the art, a filter framing system is provided and defines a number of openings for receiving a filter cell which is adapted to be positioned and locked so effectively that the entire filter bank is as efficient as a single filter. In this connection, latching means associated with the frames permit the cells to be inserted into the frame openings and latched therein. In order to perfect the seal between the cell and the frame, the cell is thereafter adapted to be advanced into firm interengagement with the frame by operation of the latching means. This latching means is also adapted to be retracted to permit withdrawal of the filter cell in order that a fresh cell may be substituted.

With the foregoing in mind, it is a principal object of the present invention to provide a filter framing system of the above type which is lighter in weight and more economical while, at the same time, attains the desired ultimate degree of sealing performance.

This and other objects are most effiectively attained by providing a framing system in which the supporting frame defines a network of filter cell receiving openings. The supporting frame includes inverted U-shaped webs and lateral flanges extending outwardly from the lower end of each of the legs of the web. Latching means are associated with the supporting frame and includes a retractable pawl which, when extended, is adapted to be disposed in the associated frame opening to consequently hold the filter cell inserted therein. The pawl is adapted to be advanced towards the web flanges to move the cell a corresponding amount to enable an interposed gasket to effect a seal at the juncture between the filter cell and flange. The pawl is thereafter adapted to be withdrawn and retracted from the frame opening to permit the removal and replacement of the filter cell.

Other objects and advantages will become apparent from the following detailed description which is to be taken in conjunction with the accompanying drawings illustrating a single somewhat preferred embodiment of the invention and in which:

FIG. 1 is a fragmentary top plan view of the filter framing system of this invention supporting filter cells across a ceiling in a manner to facilitate substantially absolute filtration and laminar flow;

FIG. 2 is a sectional view taken along the line 2—2 of FIG. 1 with certain parts broken away and removed showing the manner in which the supporting frame and associated pawls support the filter cells whereby optimum sealing is obtained, with a supporting hanger being illustrated for purposes of supplementing the desired suspension of the framing system from the existing structure across the selected opening which in the present case is a room ceiling which may also include the illustrated light wells for illuminating the particular room;

FIG. 3 is an enlarged elevational view partly in section showing the configuration of the supporting frame and associated filter cell latching means having two pawls extending therefrom;

FIG. 4 is a bottom plan view thereof taken along the line 4—4 of FIG. 3;

FIG. 5 is another side elevational view thereof viewed along the line 5—5 of FIG. 3;

FIG. 6 is another side elevational view thereof illustrating the manner in which the pawls, when advanced upwardly, effects the desired seal between the filter cells and web flanges;

Figure 1:
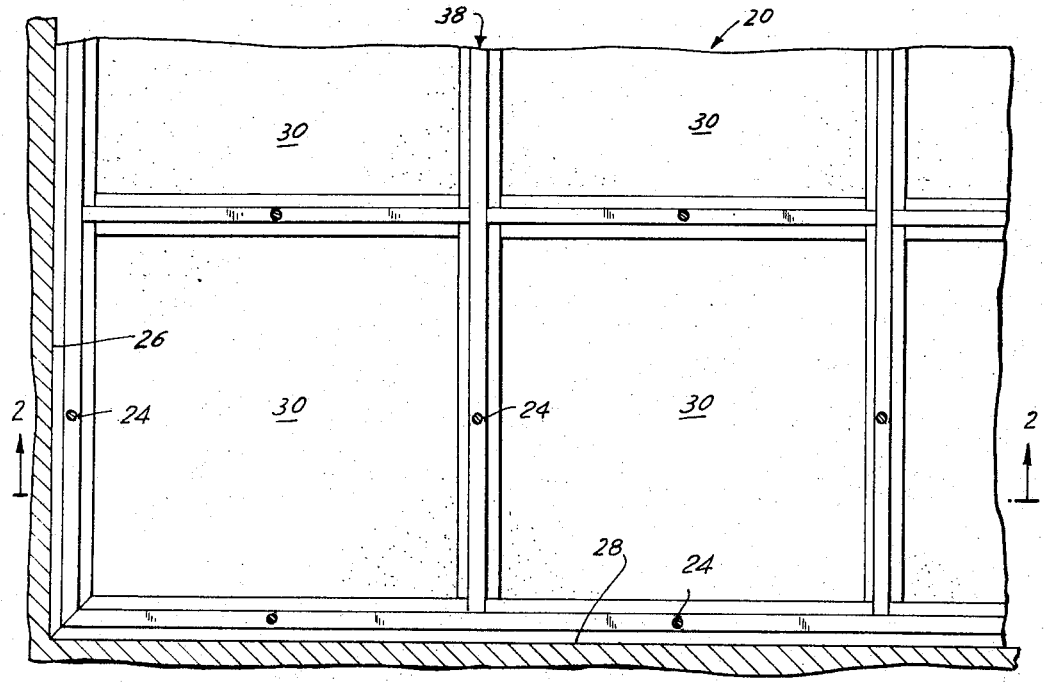
Figure 2:
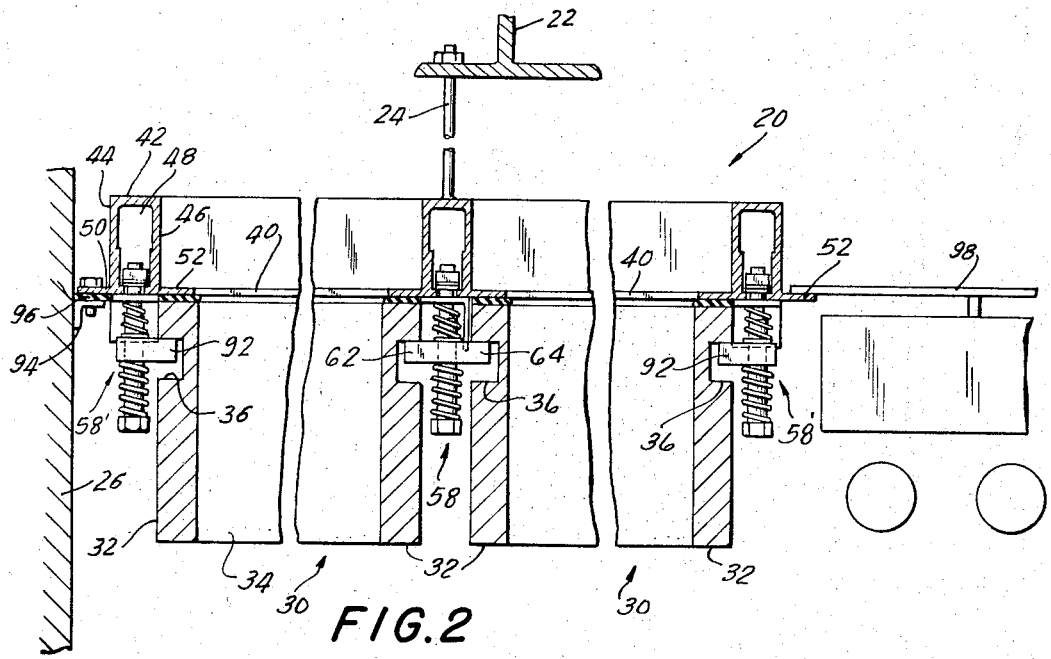
Figure 7:
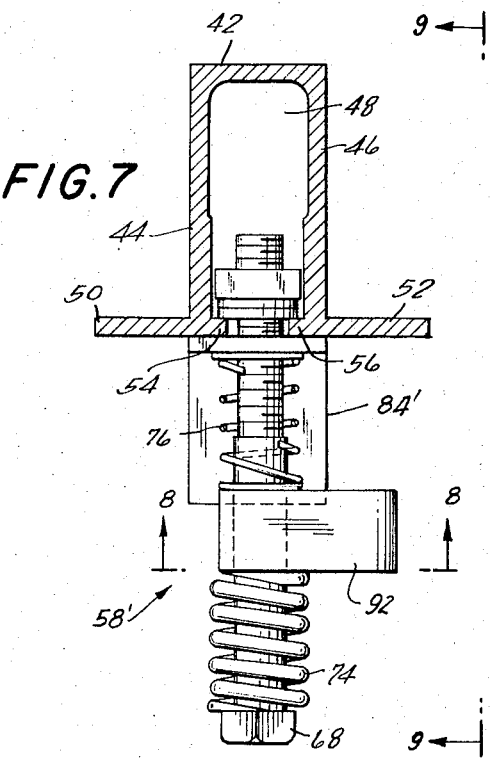
FIG. 7 is a side elevational view of the supporting frame and associated latching means which employs a single pawl generally located along the periphery of the ceiling and light wells.
Figure 8:
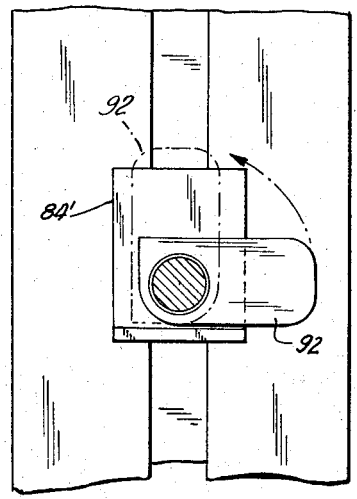
FIG. 8 is a bottom plan view thereof taken along the line 8—8 of FIG. 7.
Figure 10:
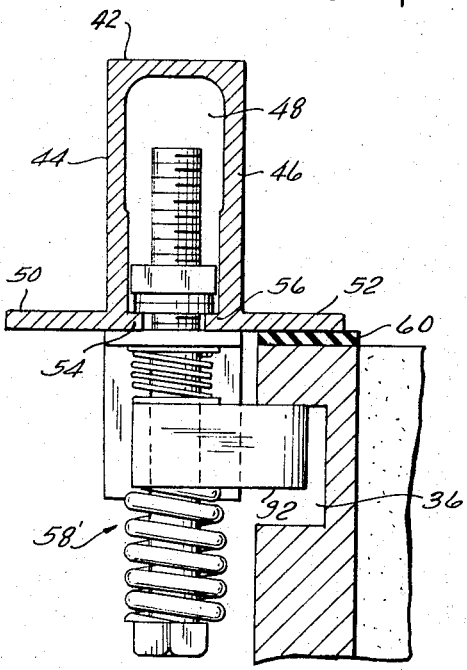
FIG. 10 is an end elevational view thereof showing the single pawl latching the supported filter cell in a sealed relationship with the web flange.
Figure 9:
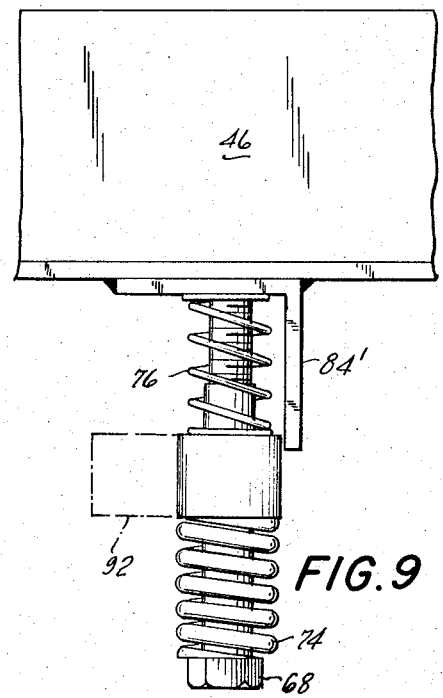
FIG. 9 is another side elevational view thereof taken along the line 9—9 of FIG. 7.

In the drawings, the filter framing system 20 is shown extending across the ceiling of the selected room which may include a network of ceiling beams 22 which may serve to cooperate in supporting intermediate parts of the framing system where needed by means of a number of hangers 24 essentially as shown in FIG. 2. The room may be taken to be of substantially rectangular shape embracing the substantially vertically extending walls 26 and 28. The system for facilitating circulation of air and generation of the desired laminar flow may assume one of a number of different forms well known to the art and may be exemplified by the arrangement illustrated in my earlier filed above identified application.

The absolute filter cells 30 may assume the construction disclosed in the above identified application as well as my co-pending application Ser. No. 349,005, filed Mar. 3, 1964, now U.S. Patent No. 3,280,541 entitled "Filter Cell and Retaining Assembly." For purposes of the present disclosure, the filter cell 30 may include a filter frame 32 supporting the selected filter media 34. These frames may be conveniently fabricated of plywood with grooves 36 cut to a predetermined depth and width to accept the pawls of the latching means to be described shortly.

The supporting frame 38 for supporting the filter cells 30 in the desired sealed manner includes a network of intersecting structural members of the type disclosed which define the substantially rectangular or square-shaped openings 40 across which the filter cells extend. These structural members preferably include inverted U-shaped webs 42 having downwardly extending legs 44 and 46 defining the internal space 48. Lateral flanges 50 and 52 extend respectively from the lower end of the web legs 44 and 46 both inwardly and outwardly. The inwardly projecting flange portions define shoulders 54 and 56 respectively for cooperating in supporting the latching means 58.

Referring now to the latching means 58 illustrated in detail in FIGS. 3 to 6, it will be observed that the particular latching means serves to advantageously hold and support one side of adjacent filter cells 30 and, at the same time, effect the desired airtight seal between the cell frame 32 and associated flange 50 or 52 as the case may be. In the preferred embodiment, this seal is obtained by pressurizing the interposed gasket 60. Towards this end, the latching means 58 is of the dual pawl type in which a pair of diametrically opposed pawls 62 and 64 extend from a common collar threadedly mounted on the bolt 66. The bolt 66 includes a lower head 68 and is suspended from the web shoulders 54 and 56 by means of the nut 70 and interposed washers 72. A spring 74 is disposed about the lower portion of the bolt 66 and is biased between the bolt head 68 and the pawls 62-64. Another spring 76 exerts sufficient pressure to require deliberate turning of the bolt head 68 to correspondingly turn the pawls 62 and 64. In this connection, the spring 76 is biased against the radial flange 78 of collar 80 and washer 82, both of which are mounted on the bolt 66. An angle piece 84 which is suitably apertured to receive the bolt 66 is spot-welded to the lower face of the flanges 50 and 52 substantially as shown. This angle piece 84 includes a downwardly projecting arm 86 which serves as a stop for the pawls 62-64 with face 88 adapted to be engaged in determining the position at which the pawls 62-64 are substantially parallel to the axis of the web 42; and the cut-out edge face 90 adapted to be engaged by the pawls 62-64 to determine the position at which the pawls are substantially normally disposed relative to the web 42 and in a position at which they are adapted to project into the filter frame grooves 36.

Thus, the pawls 62-64 are placed in a retracted position substantially parallel to the axis of the web 42 and disposed in a lowered position on the bolt 66 by turning the bolt head 68 in a counterclockwise position as viewed in FIG. 4 prior to mounting the filter cells 30 across the supporting frame openings 40. When a cell 30 is positioned across the selected opening 40, the pawls 62-64 are turned normally to the axis of the web 42 as determined by the engagement with the face 90 of the leg 84 by turning the bolt head 68 in a clockwise direction as viewed in FIG. 4. The pawls 62-64 should, at this time, be disposed in the adjacent filter frame groove 36. Thereafter the bolt head 68 is turned further in a clockwise direction to advance the pawls 62-64 upwardly towards the web flanges 50 and 52. Eventually, the filter frame 32 and associated web flange 50 or 52 will pressurize the interposed gasket 60 to perfect the desired tight seal at this juncture. Thus, it will be seen that in providing the entire ceiling with filter cells 30, these cells need only be initially positioned across the frame openings 40 and held in place by turning the pawls 62-64. Thereafter, the pawls need only be advanced upwardly to perfect the seal between the cells and the framing system 20.

At the periphery of the ceiling, only one pawl need be provided as is the case with the pawls located at the periphery of the light wells. These pawls are designated by the numeral 92 and a pawl of this type is illustrated in detail in FIGS. 7 to 10. Except for the configuration and orientation of the angle piece 84', the latching means 58' of these figures will bear identical numerals of parts identical with those associated with the latching means 58 illustrated in detail in FIGS. 3 to 6.

As will be observed in FIG. 2, the web 42 bearing the single pawl latching means 58' is supported by the vertical wall 26 by simply bolting its flange 50 to the horizontal leg of an angle iron 94 extending from this wall. An interposed gasket seals the junction between this angle iron 94 and the flange 50. A similar arrangement can be utilized for the light well or, as shown, the supporting structure 98 is welded to flange 52. To assure an airtight seal at this juncture, a suitable gasket may be interposed between the flange 52 and supporting structure 98.

In summary, installation of the filter cells 30 is easily accomplished by adjusting the appropriate pawls on their respective bolts so that the pawls extend substantially parallel to the associated webs 42. The filter cells 30 are then placed across the frame openings 40 usually starting from one side of the room and working to the other side with the cells being supported by simply turning the appropriate pawls so that they extend normally to the webs 42 into the filter frame grooves 36. This is continued until the entire ceiling or wall or area as the case may be and all of the openings 40 support a filter cell 30. The bolts are then tightened to effect the desired seal against the web flanges. In a similar manner, individual filter cells 30 may be replaced when required.

Removal of a filter cell 30 is also readily accomplished by simply turning the appropriate bolts 66 in a counterclockwise direction thereby retracting the associated pawls to simultaneously lower the supported cell 30. Eventually, the pawls will be rotated or turned so that they are substantially normal to the associated webs 42 with the filter cell dropping free from the frame opening 40. At this time, a new filter cell 30 may be substituted.

Thus, the several aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

I claim:
1. A high efficiency filter cell of a laminar flow filtering system and supporting and sealing means therefor comprising:
   a filter cell supporting frame defining at least one opening of predetermined configuration receiving a high efficiency laminar flow filter cell of corresponding configuration, said frame comprising an inverted U-shaped web extending around the entire circumference of said opening and having downwardly extending legs and a flange attached to and extending laterally from each of said legs toward the other leg and defining a shoulder disposed internally of the web and having a surface extending around the entire periphery of said opening and cooperating with the filter cell in sealing the juncture therebetween;
   a latching means forming part of said supporting frame and having portions thereof extending toward said opening and releasably supporting the cell in said opening and cooperating in sealing the juncture between the cell and the frame surface and being withdrawable for releasing the cell from said opening for releasably latching said filter cell to said frame, said latching means including a bolt having portions thereof within the web and turnable relative thereto, a nut threadedly mounted on the bolt and being disposed within said web and supported by said shoulders, said downwardly extending legs being spaced apart and engaging said nut and preventing the rotation of said nut relative to the web;
   at least one pivotally mounted retractable pawl on said bolt;
   means operatively engaging said pawl for causing said pawl to pivot about the axis of the bolt toward said opening to support the filter cell and to withdraw the pawl to permit the removal of said cell;
   means operatively engaging said pawl for advancing said pawl toward the frame upon turning the bolt relative to the nut such that the pawl is extended toward said opening and supports the filter cell thereon, such advance shifting said filter cell toward said frame;
   stop means on said support frame for limiting the extent of rotation of said pawl and thus defining the withdrawn and extended position of the pawl; and
   gasket means for sealing the juncture between the frame and said filter cell upon advancement of said pawl toward said frame, said gasket means engaging the entire periphery of said opening and the entire periphery of said filter cell and sealing the juncture between the frame and filter cell.

2. The invention in accordance with claim 1 wherein said cell comprises a predetermined filtering media and a peripheral frame supporting said media, said peripheral frame including a groove aligned with said pawl, said pawl being in an extended position and being disposed in the groove of said peripheral frame.

3. The invention in accordance with claim 1 wherein said stop means extend downwardly from the supporting frame for engagement by the pawl for limiting the rotational movement of the pawl and thus define the withdrawn and extended position of the pawl.

4. The invention in accordance with claim 1 wherein means are provided for having the pawl turn with the bolt.

5. The invention in accordance with claim 1 wherein two pawls are provided, each extending substantially diametrically opposed from the other about said bolt.

6. The invention in accordance with claim 1 wherein spring biasing means are disposed about the bolt and in engagement with the pawl to urge the filter cell supported thereby toward the supporting frame and cooperate in pressurizing the gasket interposed between the filter cell and support frame.

7. The invention in accordance with claim 6 wherein said spring biasing means includes a spring for applying friction to the pawl to prevent the unintentional turning of the pawl.

References Cited

UNITED STATES PATENTS

| | | | |
|---|---|---|---|
| 1,197,052 | 9/1916 | Newhall. | |
| 1,311,957 | 8/1919 | Ferris | 292—256.73 X |
| 1,327,011 | 1/1920 | Arndt. | |
| 1,409,524 | 3/1922 | Chase. | |
| 1,592,858 | 7/1926 | Lear | 292—256.73 X |
| 1,895,642 | 1/1933 | Preble | 55—483 X |
| 1,936,631 | 11/1933 | Lane | 49—62 X |
| 2,016,033 | 10/1935 | Christefferson | 55—484 |
| 2,050,605 | 8/1936 | Gordon et al. | 55—511 X |
| 2,126,043 | 8/1938 | Rentler | 85—1 X |
| 2,283,304 | 5/1942 | Williams | 292—256.73 X |
| 2,518,298 | 8/1950 | Erickson | 292—256 X |
| 2,605,668 | 8/1952 | Hollopeter | 85—3 |
| 2,631,053 | 3/1953 | Flynn | 292—256.73 |
| 2,676,680 | 4/1954 | Kindorf. | |
| 2,716,783 | 9/1955 | Fegan | 52—202 |
| 2,771,155 | 11/1956 | Palmore | 55—502 |
| 2,889,900 | 6/1959 | Singleton | 49—62 |
| 2,917,267 | 12/1959 | Riddle | 292—212 X |
| 3,023,041 | 2/1962 | Pluylaar | 292—256.73 X |
| 3,222,848 | 12/1965 | Koble | 55—511 X |

FOREIGN PATENTS 1,209,738  9/1959  France.

OTHER REFERENCES

Grane, V. G.: "Design Techniques for Industrial Clean Rooms," Air Conditioning, Heating and Ventilating, December 1963, pp. 57–63.

Marsh, R. C.: "Laminar Air Flow for Contamination Control," Journal of American Association for Contamination Control, vol. 2, No. 5, May 1963, pp. 7–11.

HARRY B. THORNTON, *Primary Examiner.*

R. F. BURNETT, D. TALBERT, *Assistant Examiners.*